United States Patent [19]

Persson

[11] 4,303,250
[45] Dec. 1, 1981

[54] SEALING IN AN ADAPTER FOR AVAILABLE SEALING GROOVES

[75] Inventor: Per-Åke Persson, Teckomatorp, Sweden

[73] Assignee: Stefa Industri Aktiebolag, Landskrona, Sweden

[21] Appl. No.: 102,579

[22] Filed: Dec. 11, 1979

[30] Foreign Application Priority Data

Jan. 11, 1979 [SE] Sweden .............................. 7900270

[51] Int. Cl.³ .......................................... F16K 41/00
[52] U.S. Cl. .............................. 277/189; 277/DIG. 2
[58] Field of Search ................. 277/27, 169, 168, 205, 277/207 R, 188 A, 165, DIG. 2

[56] References Cited

U.S. PATENT DOCUMENTS

| | | | |
|---|---|---|---|
| 3,462,161 | 8/1969 | Daubenberger et al. | 277/166 |
| 3,622,168 | 11/1971 | Woodling | 277/168 |
| 3,738,665 | 6/1973 | Bilco | 277/27 |
| 4,258,902 | 3/1981 | Liebert et al. | 277/189 |
| 4,261,583 | 4/1981 | de Vries | 277/189 |

Primary Examiner—Robert I. Smith
Attorney, Agent, or Firm—Perry Carvellas

[57] ABSTRACT

Sealing in an adapter for available sealing grooves, preferably for a reciprocating piston rod (1) of a cylinder (2) and for adapting the sealing to other types of sealing rings and comprising an adapter body (7) the outer dimensions of which substantially correspond to those of the available sealing groove (3) and having a radially inner sealing (8) providing a seal between the piston rod (1) and the adapter body (7) and a radially outer sealing (9) providing a seal between the adapter body (7) and the cylinder (2). Preferably the first mentioned sealing (8) is mounted at or adjacent the end of the adapter body (7), which is opposed the pressurized chamber (P) whereas the second sealing (9) is provided at or adjacent the end of the adapter body (7) facing the pressurized chamber (P). One and the same adaptor body may include one or several sealings of both kinds.

28 Claims, 6 Drawing Figures

SEALING IN AN ADAPTER FOR AVAILABLE SEALING GROOVES

The present invention relates to a sealing in an adaptor for such available sealing grooves which have previously been used for more conventional types of sealing devices. The invention is mainly directed to a sealing for reciprocating pistons as for instance used in hydraulic or pneumatic motors, in which it is intended to seal the reciprocating piston rod between a chamber under pressure and a chamber having no pressure. In the following the invention will mainly be described with reference to hydraulic piston-cylinder motors, but it is obvious to the expert that the invention is not restricted to such field of use and that it can be used for all kinds of different purposes.

In reciprocating hydraulic motors like hydraulic piston-cylinder units, the piston rod is generally sealed close to the outer end of the cylinder, and for this purpose the cylinder is formed with a radial groove in which a sealing is mounted. The sealed is secured by a cylinder end. The said sealing groove can only be used for conventional sealings for which the groove is designed. In such applications it is therefore not possible to use certain types of modern sealing which need a specially designed sealing groove. One such modern type sealing comprises a sealing ring of uniform thickness and provided in a sealing groove which at the end thereof facing the pressurized chamber has a raised portion providing a stronger pressure by the part of the sealing ring located adjacent the pressurized chamber then the remaining part of the sealing ring. Such sealings are previously known and have proved to be advantageous. In order to make use of such sealings and other advantageous sealings in available sealing grooves the present invention relates to an adaptor which both contains a sealing of the above mentioned type or of another type for providing a sealed connection between the adaptor and the reciprocating piston rod and another sealing for providing a seal between the adaptor and the available sealing groove in which the adaptor is mounted.

The characterizing features of the invention are evident from the appended claims.

The invention will now be described more in detail with reference to the accompanied drawings which illustrate some embodiments of the invention.

FIG. 1 is an axial cross section through a portion of a piston-cylinder motor having a reciprocating piston and in which a sealing in an adaptor according to the invention is mounted in the available sealing groove of the cylinder part.

FIG. 2 separately shows a part of the adaptor together with the sealing rings belonging thereto before being mounted, and FIG. 3 in a corresponding way shows an alternative embodiment of an adaptor with the sealing rings in its mounted and pressurized state.

Figure 1:
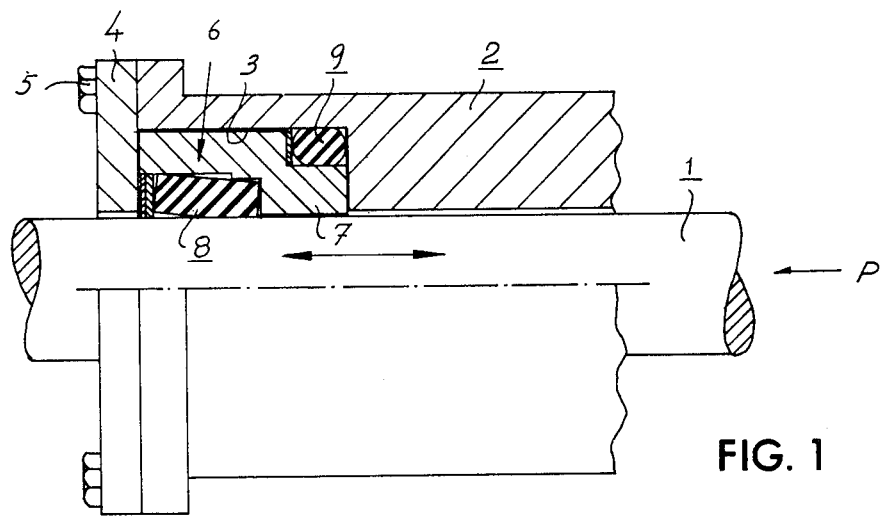

In FIG. 1 is shown a hydraulic motor having a reciprocating piston rod 1 and a cylinder 2 which adjacent the outer end is formed with a sealing groove 3 designed for mounting of a conventional sealing which is secured by means of a cylinder end 4 which is mounted at the end of the cylinder 2 by means of screws 5.

According to the invention an adapter 6 is provided for the purpose of adapting the illustrated hydraulic motor to a modern type of sealing. The adapter 6 comprises an adapter body 7 of a suitable hard material like metal, plastic or similar material, a first sealing 8 providing a seal between the reciprocating piston rod 1 and the adaptor body 7 and a second sealing 9 providing the seal between the cylinder 2 and the adapter body 7. As most clearly illustrated in FIG. 2 the adapter body 7 is formed with two different grooves for the sealings 8 and 9, of which the groove 10 for the sealing 8 is provided open radially inwards and in the illustrated case also open axially outwards from the pressurized chamber P. At the axial end of the groove 10 facing the pressurized chamber P the groove 10 is formed with a radially inwards widened portion 11 having less diameter than the remaining part of the groove. In the sealing groove 10 a sealing ring 12 of rubber-elastic materiel is provided. The sealing ring 12 preferably has a rectangular cross section form. As usual a lubricating ring 13 and a support ring 14 are provided in the sealing groove 10 axially outside the sealing ring 12.

At the end of the sealing facing the pressurized chamber P the adaptor body 7 is formed with a radially outwards directed groove 15 in which a sealing ring 16 of rubber-elastic materiel like an O-ring is provided. In order to prevent the sealing ring 16 from being forced into the space between the adaptor body 7 and the cylinder groove 3 there is provided a support ring 17. The adaptor body preferably has such dimensions as to nearly completely fill the cylinder sealing groove 3 and has to be secured in the axial direction by the cylinder end 4.

The widened portion 11 of the sealing groove 10 for the piston road sealing 8 provides a harder pressure on the part of the sealing 12 facing the pressurized chamber P than the remaining part of the sealing ring. Thereby the said widened portion 11 provides a more effective sealing than conventional sealing rings, and at the same time the risk is reduced that the sealing is pressed out into the space between the piston rod 1 and the lubricating ring 13 and the support ring 14 respectively and the cylinder end 4.

The second sealing 9 provides a seal between the adaptor body 7 and the cylinder groove 3 against the pressure medium which may tend to moove radially outwards between the adaptor body 7 and the cylinder groove 3.

Figure 3:
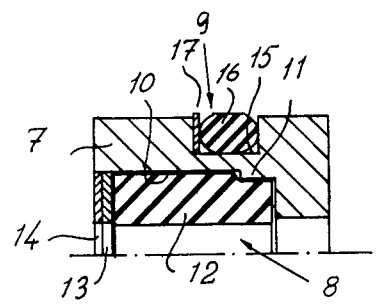

As shown the sealings 8 and 9 are provided in grooves which are axially open, but it is to be understood that the sealings may also be provided in closed grooves. Consequently FIG. 3 shows a sealing between the adaptor body 7 and the cylinder 2 mounted in a closed groove provided some distance spaced from the end of the adaptor body facing the pressurized chamber P. Likewise the sealing 8 for the piston rod may be slightly spaced from the end of the adaptor body 7 which is opposite to the end facing the pressurized chamber P. Preferably, however, the sealing 9 is provided closer to the pressurized chamber P than the sealing 8.

Figure 4:
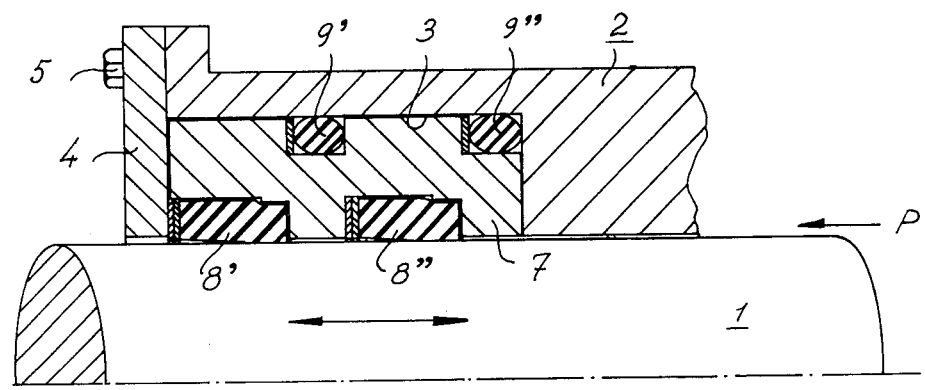
FIG. 4 shows an axial cross section through a modified embodiment of the invention.

FIG. 4 shows an embodiment of the sealing according to the invention comprising two piston rod sealings 8', 8" provided axially spaced and two cylinder sealings 9' and 9" likewise provided axially spaced. As evident the piston rod sealing 8' and the cylinder sealing 9" are provided in grooves which are open in the axial direction, whereas the piston rod sealing 8" and the cylinder sealing 9' are provided in grooves which are closed in the axial direction. The sealings 8' and 8" may be of the same or different kind, and also the sealings 9' and 9" may be of the same or different kind. Preferably the sealings 8" and 9" are formed for a higher sealing pressure than the sealings 8' and 9' respectively, since the first mentioned sealing takes a larger part of the sealing pressure than the latter sealings.

Figure 2:
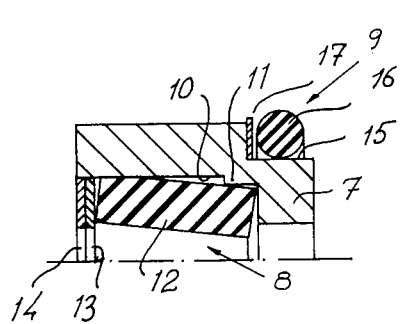
Figure 5:
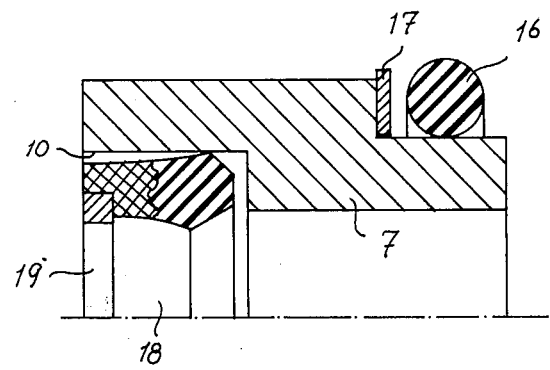
FIGS. 5 and 6 illustrate in the same way as in FIG. 2 two further alternative embodiments of the sealing.
Figure 6:
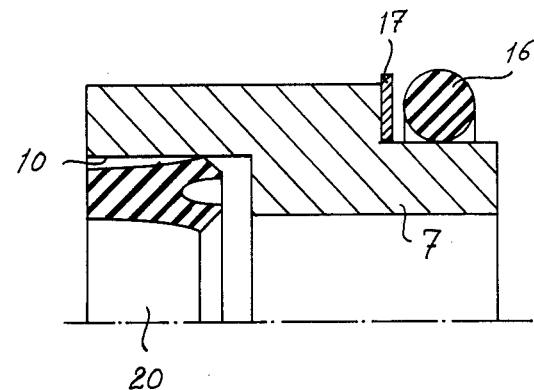

In FIGS. 5 and 6 two further embodiments of the invention are shown in the same way as in FIG. 2. The latter embodiments of the invention comprises an adapter body 7 intended to be mounted in the available sealing groove in the cylinder or a similar means of a cylinder-piston apparatus. At the end facing the pressurized chamber the adaptor body 7 is formed with a sealing ring 16 and a belonging support ring 17 and at the opposite end a sealing between the adaptor body 7 and the reciprocating piston rod (not shown) is mounted. In FIG. 5 the last mentioned sealing ring 18 is formed as a so called compact sealing ring which is known per se and which has a belonging support ring 19. In FIG. 6 the said last mentioned sealing is formed as a lip sealing ring 20 of a type which is known per se.

It is to be understood that the above described embodiments of the invention which are illustrated in the drawings do not restrict the invention and that all kinds of different modifications may be presented within the scope of the appended claims.

I claim:

1. An adaptor for sealing grooves of a cylinder for sealing a reciprocating piston rod, comprising an adaptor body, the outer dimensions of which substantially correspond to those of the sealing groove of the cylinder and which is formed with a radially inner sealing means providing a seal between the piston rod and the adaptor body, said radially inner sealing means is provided at or adjacent the end of the adaptor body which is opposite an end facing a pressurized chamber, said radially inner sealing means comprises a sealing ring having a rectangular or elongated cross section form disposed in said sealing ring groove which sealing ring groove, adjacent the end of the cylinder ring groove facing said pressurized chamber is formed with a thickened portion having less diameter than the remaining part of the sealing ring groove.

2. The adaptor of claim 1 wherein the radially outer sealing means is provided at or adjacent the end of the adaptor body facing the pressurized chamber and comprises a sealing ring of rubber-elastic material and a support ring at the end of the sealing ring opposite the pressurized chamber.

3. The adaptor of claim 2 wherein the outer sealing means between the adaptor body and the cylinder is provided in a groove which is open in one axial direction.

4. The adaptor of claim 2 wherein the outer sealing means between the adaptor body and the cylinder is provided in a groove which is closed in both axial directions.

5. The adaptor of claim 2 wherein the adaptor comprises two or more axially spaced outer sealings means between the adaptor body and the cylinder.

6. The adaptor of claim 1 wherein the inner sealing means between the piston rod and the adaptor body is mounted in a sealing ring groove which is open in one axial direction or is closed in both axial directions.

7. The adaptor of claim 1 wherein the outer sealing means between the adaptor body and the cylinder is provided in a groove which is open in one axial direction or which is closed in both axial directions.

8. The adaptor of claim 1 wherein the adaptor comprises two or several axially spaced inner sealings means between the piston rod and the adaptor body and two or more axially spaced outer sealings means between the adaptor body and the cylinder.

9. The adaptor of claim 1 wherein the adaptor comprises two or several axially spaced inner sealings means between the piston rod and the adaptor body or two or more axially spaced outer sealings means between the adaptor body and the cylinder.

10. The adaptor of claim 1 wherein the sealing groove of the adaptor body for the sealing between the adaptor body and the piston rod is circular cylindric, and the sealing ring is a compact sealing ring formed with a thickened sealing portion facing the pressurized chamber and has cooperating therewith a support ring.

11. The adaptor of claim 1 wherein the sealing groove of the adaptor body for the sealing between the adaptor body and the piston rod is circular cylindric, and the sealing ring is a lip sealing ring and mounted with the sealing lip thereof at the end of the sealing ring facing the pressurized chamber.

12. The adaptor of claim 1 wherein the inner sealing means between the piston rod and the adaptor body is mounted in a sealing ring groove which is open in one axial direction.

13. The adaptor of claim 12 wherein the inner sealing means between the piston rod and the adaptor body is mounted in a sealing ring groove which is closed in both axial directions.

14. The adaptor of claim 12 wherein the adaptor comprises two or several axially spaced inner sealings means between the piston rod and the adaptor body.

15. An adaptor for sealing grooves of a cylinder for sealing a reciprocating piston rod, comprising an adaptor body, the outer dimensions of which substantially correspond to those of the sealing groove of the cylinder and which is formed with a radially inner sealing means providing a seal between the piston rod and the adaptor body, said radially inner sealing means comprising a sealing ring having a rectangular or elongated cross section form disposed in a sealing ring groove which sealing ring groove, adjacent the end of the cylinder ring groove facing said pressurized chamber is formed with a thickened portion having less diameter than the remaining part of the sealing ring groove, and a radially outer sealing means providing a seal between the adaptor body and the cylinder.

16. The adaptor of claim 15 wherein the radially inner sealing means is provided at or adjacent the end of the adaptor body which is opposite an end facing a pressurized chamber.

17. The adaptor of claim 16 wherein the inner sealing means between the piston rod and the adaptor body is mounted in a sealing ring groove which is open in one axial direction.

18. The adaptor of claim 16 wherein the inner sealing means between the piston rod and the adaptor body is mounted in a sealing ring groove which is closed in both axial directions.

19. The adaptor of claim 16 wherein the adaptor comprises two or several axially spaced inner sealings means between the piston rod and the adaptor body.

20. The adaptor of claim 15 wherein the radially outer sealing means is provided at or adjacent the end of the adaptor body facing the pressurized chamber and comprises a sealing ring of rubber-elastic material and a support ring at the end of the sealing ring opposite the pressurized chamber.

21. The adaptor of claim 20 wherein the outer sealing means between the adaptor body and the cylinder is provided in a groove which is open in one axial direction.

22. The adaptor of claim 20 wherein the outer sealing means between the adaptor body and the cylinder is provided in a groove which is closed in both axial directions.

23. The adaptor of claim 20 wherein the adaptor comprises two or more axially spaced outer sealings means between the adaptor body and the cylinder.

24. The adaptor of claim 15 wherein the inner sealing means between the piston rod and the adaptor body is mounted in a sealing ring groove which is open in one axial direction or is closed in both axial directions.

25. The adaptor of claim 15 wherein the outer sealing means between the adaptor body and the cylinder is provided in a groove which is open in one axial direction or which is closed in both axial directions.

26. The adaptor of claim 15 wherein the adaptor comprises two or several axially spaced inner sealings means between the piston rod and the adaptor body and two or more axially outer spaced sealings means between the adaptor body and the cylinder.

27. The adaptor of claim 15 wherein the adaptor comprises two or several axially spaced inner sealing means between the piston rod and the adaptor body or two or more axially spaced outer sealings means between the adaptor body and the cylinder.

28. An adaptor for sealing grooves of a cylinder for sealing a reciprocating piston rod, consisting essentially of an adaptor body, the outer dimensions of which substantially correspond to those of the sealing groove of the cylinder and which is formed with at least one radially inner sealing means providing a seal between the piston rod and the adaptor body, said radially inner sealing means consisting of at least one sealing ring having a rectangular or elongated cross-section form disposed in a sealing ring groove provided at or adjacent the end of the adaptor facing the non-pressurized chamber and whereby the inner cylinder ring groove at the end facing the pressurized chamber has a stepped landing having less diameter than the remaining part of the sealing ring groove, and at least one radially outer sealing means providing a seal between the adaptor body and the said cylinder groove and provided at or adjacent the end of the adaptor body facing the pressurized chamber.

* * * * *